United States Patent
Oh et al.

(10) Patent No.: US 7,068,336 B2
(45) Date of Patent: Jun. 27, 2006

(54) LIQUID CRYSTAL DISPLAY DEVICE HAVING VARIABLE VIEWING ANGLE

(75) Inventors: Sung-Hun Oh, Seoul (KR); Man-Hoan Lee, Seoul (KR)

(73) Assignee: LG.Philips LCD Co., Ltd., Seoul (KR)

(*) Notice: Subject to any disclaimer, the term of this patent is extended or adjusted under 35 U.S.C. 154(b) by 237 days.

(21) Appl. No.: 10/734,180

(22) Filed: Dec. 15, 2003

(65) Prior Publication Data

US 2004/0125298 A1    Jul. 1, 2004

(30) Foreign Application Priority Data

Dec. 13, 2002 (KR) .................. 10-2002-0079852
Dec. 24, 2002 (KR) .................. 10-2002-0083200

(51) Int. Cl.
*G02F 1/141* (2006.01)
*G02F 1/133* (2006.01)

(52) U.S. Cl. .................. 349/123; 349/73; 349/129

(58) Field of Classification Search ............. 349/123, 349/129, 73
See application file for complete search history.

(56) References Cited

U.S. PATENT DOCUMENTS

| | | | |
|---|---|---|---|
| 5,479,282 A | | 12/1995 | Toko et al. |
| 5,631,754 A | * | 5/1997 | Jannson et al. ............... 349/64 |
| 6,335,775 B1 | * | 1/2002 | Iwamura et al. ............ 349/125 |
| 6,388,649 B1 | | 5/2002 | Tanaka et al. |
| 6,654,080 B1 | * | 11/2003 | Khan et al. ................... 349/73 |
| 6,665,034 B1 | * | 12/2003 | Suzuki ........................ 349/129 |
| 6,842,210 B1 | * | 1/2005 | Hashimoto et al. ......... 349/115 |

FOREIGN PATENT DOCUMENTS

| | | |
|---|---|---|
| JP | 08-152636 | 6/1996 |
| JP | 08-184836 | 7/1996 |

OTHER PUBLICATIONS

M. Hasegawa et al., 11.3: Reflective Stacked Crossed Guest-Host Display with a Planarized Inner Diffuser, SID 00 DIGEST, pp. 128-131.

* cited by examiner

*Primary Examiner*—Toan Ton
(74) *Attorney, Agent, or Firm*—McKenna Long & Aldridge LLP

(57) ABSTRACT

A liquid crystal display device having variable viewing angles includes a first liquid crystal cell having first and second substrates spaced apart from and facing each other, a pixel electrode formed on an inner surface of the first substrate, a common electrode formed on an inner surface of the second substrate, and a first liquid crystal layer interposed between the pixel electrode and the common electrode; a second liquid crystal cell on the first liquid crystal cell, the second liquid crystal cell having third and fourth substrates spaced apart from and facing each other, and two alignment layers, wherein the first and second alignment layers are arranged to have holographic patterns; and a switching part for selectively applying electric field to the second liquid crystal.

10 Claims, 8 Drawing Sheets

LIQUID CRYSTAL DISPLAY DEVICE HAVING VARIABLE VIEWING ANGLE

This application claims the benefit of Korean Patent Application Nos. 2002-079852 filed in Korea on Dec. 13, 2002 and 2002-083200 filed in Korea on Dec. 24, 2002, which are hereby incorporated by reference for all purposes as if fully set forth herein.

BACKGROUND OF THE INVENTION

1. Field of the Invention

The present invention relates to a liquid crystal display (LCD) device and more particularly, to a liquid crystal display device having variable viewing angles.

2. Discussion of the Related Art

Cathode ray tubes (CRTs) have been widely used as a display devices for televisions and a computer monitors. However, the cathode ray tube has a large size, heavy weight, and high driving voltage. Therefore, flat panel displays, being thin, light weight, and low in power consumption are increasing in demand. Thus, thin film transistor liquid crystal display (TFT-LCD) devices having good image reproduction and reduced thickness have been developed. In addition, LCD devices have gradually grown large in display area.

In general, a liquid crystal display (LCD) device includes two substrates, which are spaced apart and facing each other, and a liquid crystal layer interposed between the two substrates. Each of the substrates includes an electrode, and the electrodes of each substrate are also facing each other. Voltage is applied to each electrode, and thus an electric field is induced between the electrodes. Alignment of the liquid crystal molecules is changed by the varying intensity or direction of the electric field. The LCD device displays a picture by varying transmissivity of the light varying according to the arrangement of the liquid crystal molecules.

A conventional LCD device will be described hereinafter in detail with reference to figures.

FIG. 1 is an exploded perspective view illustrating a conventional LCD device. As shown in FIG. 1, the conventional LCD device 11 has upper and lower substrates 5 and 22, which are spaced apart from and facing each other, and also has liquid crystal 14 interposed between the upper substrate 5 and the lower substrate 22.

The upper substrate 5 includes a black matrix 6, a color filter layer 7, and a common electrode 18 subsequently on the inside (i.e., the side facing the lower substrate 22). The black matrix 6 has an opening. The color filter layer 7 corresponds to openings in the black matrix 6 and includes three sub-color filters of red (R), green (G), and blue (B). The common electrode 18 is formed on the color filter 7 and is transparent.

At least one gate line 13 and at least one data line 15 are formed on the inner surface of the lower substrate 22 (i.e., the side facing the upper substrate 5). The gate line 13 and the date line 15 cross each other to define a pixel area P. A thin film transistor T, as a switching element, is formed at the crossing of the gate line 13 and the data line 15. The thin film transistor T includes a gate electrode, a source electrode and a drain electrode. A plurality of such thin film transistors is arranged in a matrix form to correspond to other crossings of gate and data lines 13 and 15. A pixel electrode 17, which is connected to the thin film transistor T, is formed in the pixel area P. The pixel electrode 17 corresponds to the sub-pixel color filter, and is made of a transparent conductive material such as indium-tin-oxide (ITO) that transmits light. The lower substrate 22, which includes the thin film transistors T and the pixel electrodes 17 arranged in the matrix form may be commonly referred to as an array substrate.

Although not shown in the figure, the LCD device further includes a backlight as a light source and a printed circuit board (PCB) including driver integrated circuits (ICs) as a driving element. The upper substrate 5 and the lower substrate 22 having the liquid crystal layer 14 therebetween may be commonly referred to as a liquid crystal cell or as a liquid crystal panel.

A liquid crystal (LC) cell having twisted nematic (TN) mode is widely used. Liquid crystal molecules in the TN mode LC cell have rod shapes that are thin and long and that are helically twisted such that long axes of the liquid crystal molecules are progressively changed, having a uniform pitch.

In the TN mode, incident polarized light has different characteristics of viewing angles according to arrangements of long axes and short axes of the liquid crystal molecules. That is, viewing angles of the LCD device are made along the long axes of the liquid crystal molecules having a helical structure, and thus the viewing angles are varied depending on a viewing direction.

Generally, the liquid crystal display device has a symmetric horizontal viewing angle range of about +45 degrees to about −45 degrees and a vertical viewing angle range of about −15 degrees to about +15 degrees. Accordingly, images may be easily distorted in the vertical direction as the viewing angles get narrow.

In the case of small size LCD devices, the display is seen from limited angles by a few users. As LCD displays grow larger, the LCD device may be watched from a wider variety of angles by a lot of users at the same time. In these situations, the narrow viewing angles of the LCD device may cause problems.

To overcome the limited viewing angles of the LCD device, various modes, such as a film-compensated mode, a multi-domain mode, an in-plane switching (IPS) mode, and so forth, have been proposed. In the film-compensated mode, a compensating film or a diffusing film may be used. In the multi-domain mode, a pixel is divided into several domains and one domain has an arrangement direction different from other domains, thereby compensating the viewing angle. In the IPS mode, two electrodes for driving LC molecules are disposed on one substrate, whereby an electric field is induced in plane.

However, the LCD device has only a wide viewing angle mode, and the viewing angle mode cannot be changed according to circumstances, for example, a display for a cash dispenser of a bank that requires security.

SUMMARY OF THE INVENTION

Accordingly, the present invention is directed to a liquid crystal display device having variable viewing angles that substantially obviates one or more of problems due to limitations and disadvantages of the related art.

An advantage of the present invention is to provide a liquid crystal display device having variable viewing angles that is used as a wide viewing angle mode or as a narrow viewing angle according to circumstances.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device having variable viewing angles includes a first liquid crystal cell having first and second substrates spaced apart from and facing each other, a pixel electrode formed on an inner surface of the first substrate, a common electrode formed on an inner surface of the second substrate, and a first liquid crystal layer interposed between the pixel electrode and the common electrode; a second liquid crystal cell on the first liquid crystal cell, the second liquid crystal cell having third and fourth substrates spaced apart from and facing each other, a first alignment layer formed on an inner surface of the third substrate, a second alignment layer formed on an inner surface of the fourth substrate, and a second liquid crystal layer interposed between the first and second alignment layers, wherein the first and second alignment layers are arranged to have holographic patterns; and a switching part for selectively applying electric field to the second liquid crystal layer.

In another aspect of the present invention, a liquid crystal display device having variable viewing angles includes a first substrate; a pixel electrode on a first surface of the first substrate; a first liquid crystal layer on the pixel electrode; a common electrode on the first liquid crystal layer; a second substrate on the common electrode; a third substrate on the second substrate; a first alignment layer on the third substrate and arranged to have holographic patterns; a second liquid crystal layer on the first alignment layer; a second alignment layer on a the second liquid crystal layer and arranged to have holographic patterns; a fourth substrate on the second alignment layer; a switching part selectively apply electric field to the second liquid crystal layer.

In another aspect of the present invention, a liquid crystal display device having variable viewing angles includes a first liquid crystal cell having first and second substrates spaced apart from and facing each other, a pixel electrode formed on an inner surface of the first substrate, a common electrode formed on an inner surface of the second substrate, and a first liquid crystal layer interposed between the pixel electrode and the common electrode; a second liquid crystal cell on the first liquid crystal cell, the second liquid crystal cell having third and fourth substrates spaced apart from and facing each other and a second liquid crystal layer interposed between the third and fourth substrates, wherein the second liquid crystal layer includes discotic liquid crystal; and a switching part for selectively applying electric field to the second liquid crystal layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
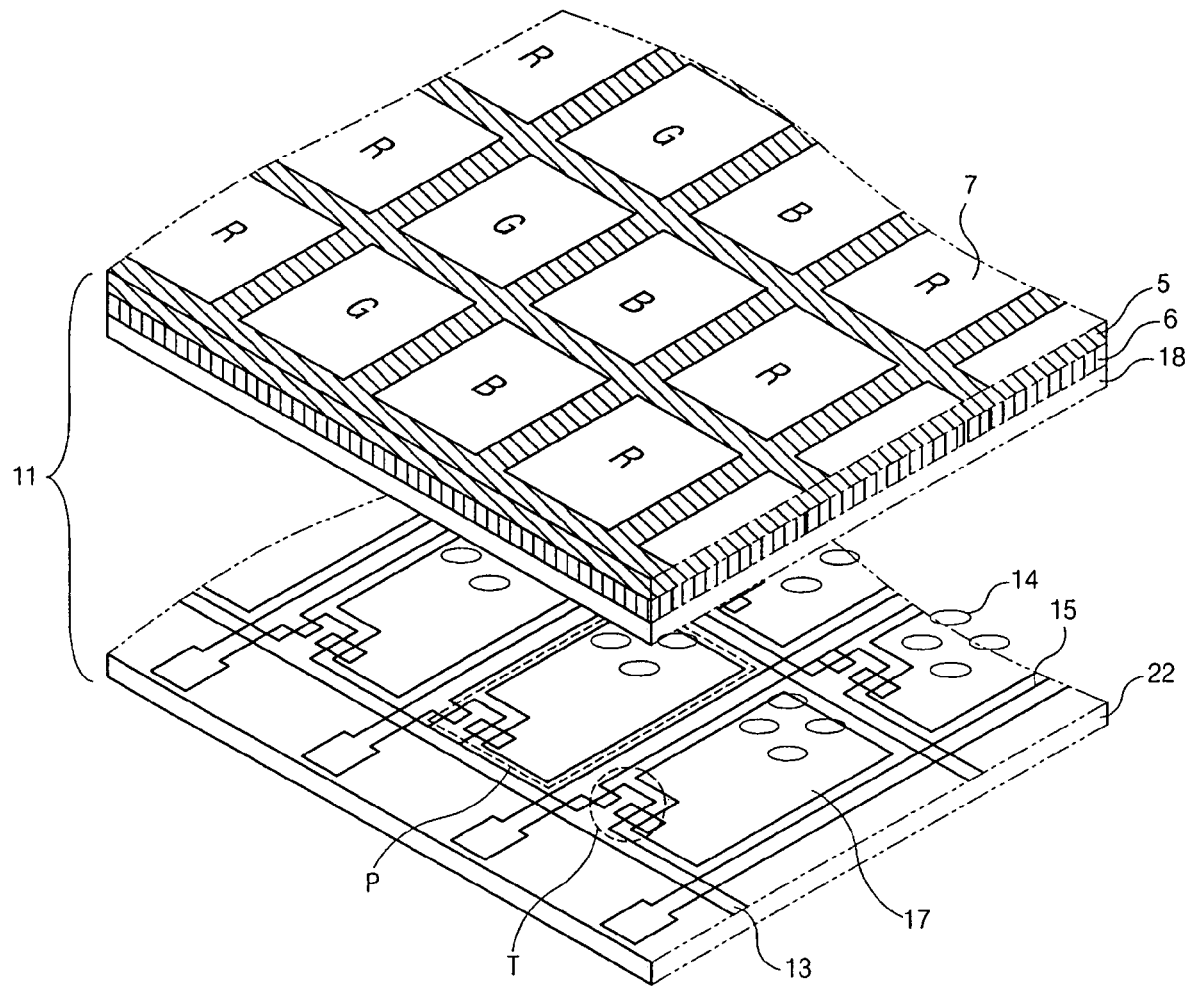
FIG. 1 is an exploded perspective view illustrating a conventional liquid crystal display (LCD) LCD.
Figure 2:
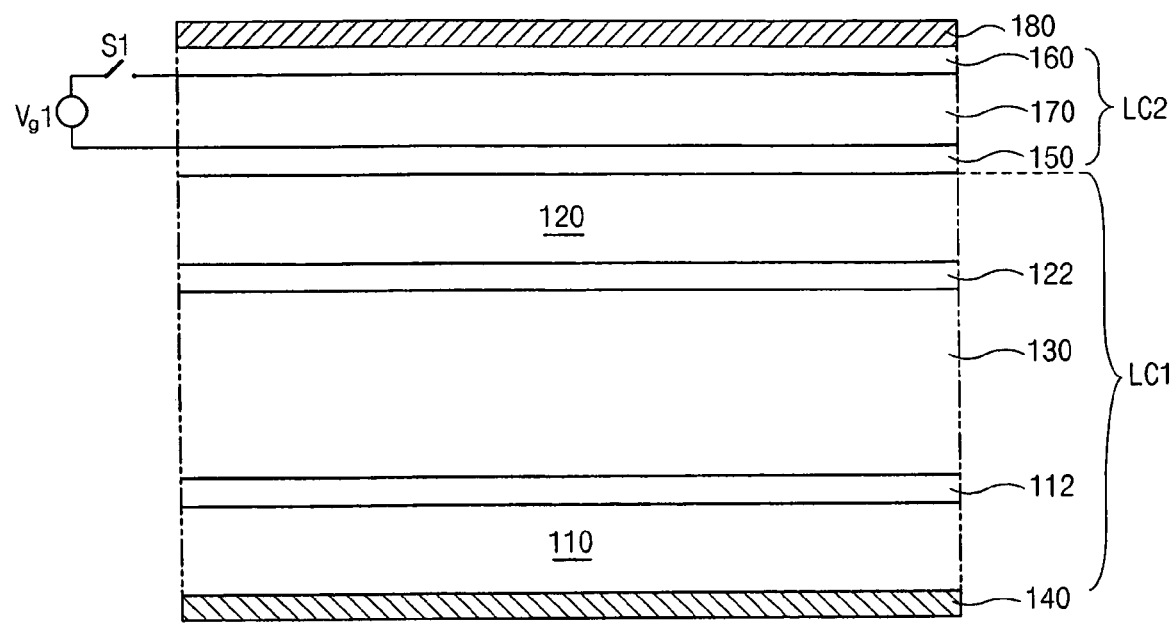
FIG. 2 is a schematic cross-sectional view of a liquid crystal display (LCD) device according to a first embodiment of the present invention.

FIG. 2 is a schematic cross-sectional view of a liquid crystal display (LCD) device according to a first embodiment of the present invention.

As illustrated in FIG. 2, a first substrate 110 and a second substrate 120 are spaced apart from and facing each other. A pixel electrode 112 and a common electrode 122 are formed on inner surfaces of the first and second substrates 110 and 120, respectively. A first liquid crystal layer 130 is interposed between the pixel electrode 112 and the common electrode 122. The first substrate 110, the second substrate 120 and the first liquid crystal layer 130 constitute a first liquid crystal cell LC1.

Although not shown in the figure, a thin film transistor (TFT) may be formed on the inner surface of the first substrate 110 and may be connected to the pixel electrode 112. A color filter layer may be formed between the second substrate 120 and the common electrode 122.

A first polarizer 140 is disposed on an outer surface of the first substrate 110 and a backlight (not shown) is located on an outer surface of the first polarizer 140 to provide light.

A second liquid crystal cell LC2 is disposed on an outer surface of the second substrate 120 and a second polarizer 180 is situated on the second liquid crystal cell LC2. The second liquid crystal cell LC2 includes a third substrate 150, a fourth substrate 160 and a second liquid crystal layer 170 interposed therebetween.

Although not shown in the figure, first and second electrodes are formed on inner surfaces of the third and fourth substrates 150 and 160, respectively. The first and second electrodes are connected to an outer voltage source Vg1 through a switch S1, wherein the voltage source Vg1 and the switch S1 constitute a switching part. The voltage source Vg1 and the switch S1 are only one example for selectively applying an electric field to the second liquid crystal layer 170, and other methods may be used.

In addition, alignment layers are formed on the first and second electrodes, respectively. The alignment layers are arranged using holographic patterns, and LC molecules of the second liquid crystal layer 170 may form interference patterns by the arranged alignment layers. Therefore, light is diffused due to the interference patterns.

However, when an electric field is induced in the second liquid crystal layer 170, LC molecules of the second liquid crystal layer 170 all are arranged vertically or horizontally with respect to the electric field. Thus, diffusion effects of light are not shown.

The third and fourth substrates 150 and 160 may be made of glass, plastics or resin. The third and fourth substrates 150 and 160, beneficially, may be made in a form of an adhesive film by forming an electrode and an alignment layer on one side of a flexible film and coating an adhesive material on the other side of the flexible film.

In FIG. 2, the pixel electrode of each pixel and the common electrode in the first liquid crystal cell LC1 are driven according to gate and data signals, whereby the first liquid crystal cell LC1 provides light of narrow viewing angles to the second liquid crystal cell LC2. The second liquid crystal cell LC2 supplied the light of the narrow viewing angles from the first liquid crystal cell LC1 may be used in two modes.

In case of requiring wide viewing angles, that is, when a plurality of users watches a liquid crystal display (LCD) device from various angles, for example, the LCD device is driven turning off the switch S1. If the switch S1 is turned off, voltage from the voltage source Vg1 is not supplied to the second liquid crystal cell LC2. Therefore, the liquid crystal molecules of the second liquid crystal layer 170 are arranged along the surfaces of the alignment layers that are arranged to have holographic patterns, thereby diffusing light.

Meanwhile, in case of requiring narrow viewing angles, that is, when a few users sees the LCD device from limited angles, for example, the LCD device is driven by turning on the switch S1. If the switch S1 is turned on, voltage from the voltage source Vg1 is supplied to the second liquid crystal cell LC2. Accordingly, the liquid crystal molecules of the second liquid crystal layer 170 are arranged perpendicularly or parallel with respect to an induced electric field regardless of the arrangement direction of the alignment layer, thereby transmitting light only in certain directions.

Therefore, the viewing angles of the LCD device can be varied as occasion demands.

The second liquid crystal cell LC2 will be explained in detail with reference to attached drawings.

Figure 3A:
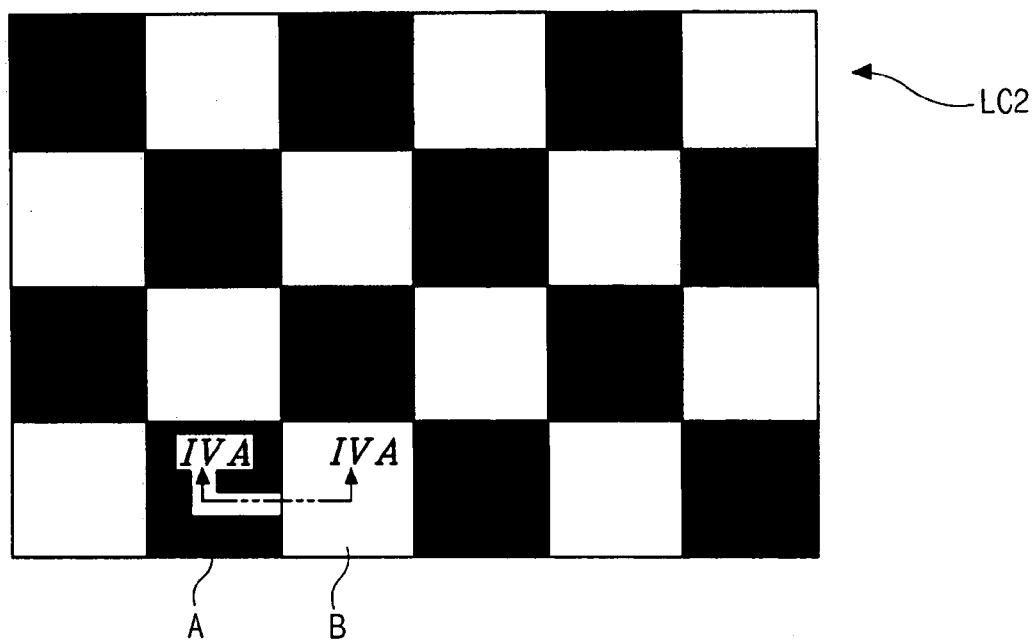
FIG. 3A is a plan view schematically illustrating the second liquid crystal cell of the LCD device of the first embodiment when an electric field is not applied.
Figure 3B:
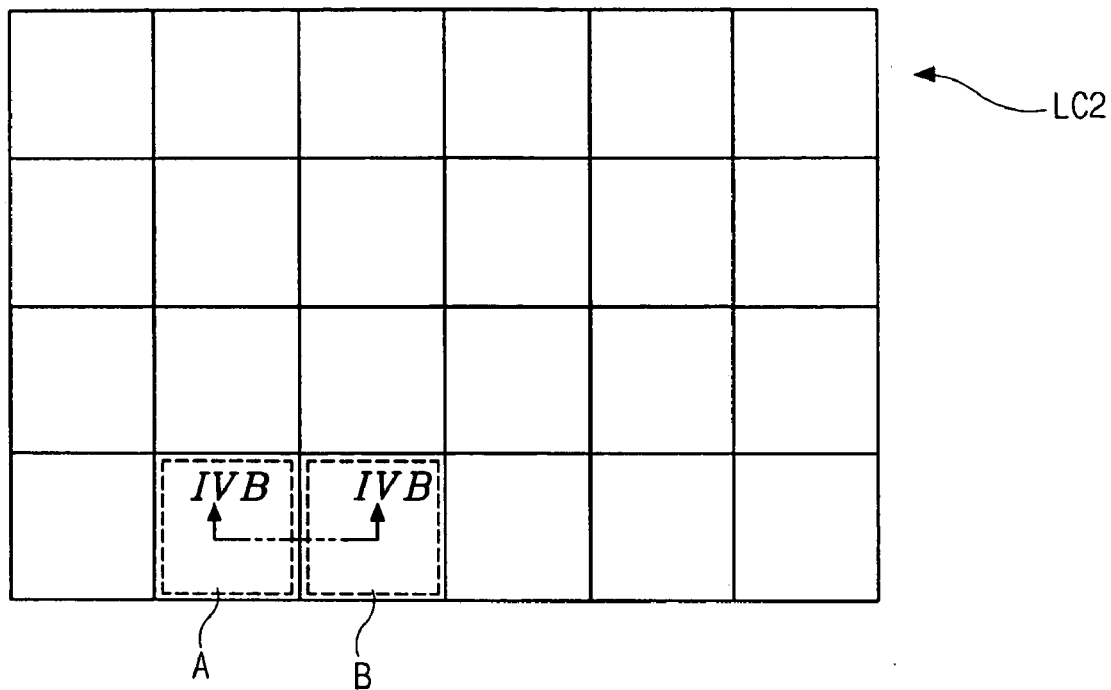
FIG. 3B is a plan view schematically illustrating the second liquid crystal cell of the LCD device of the first embodiment when an electric field is applied.
Figure 4A:
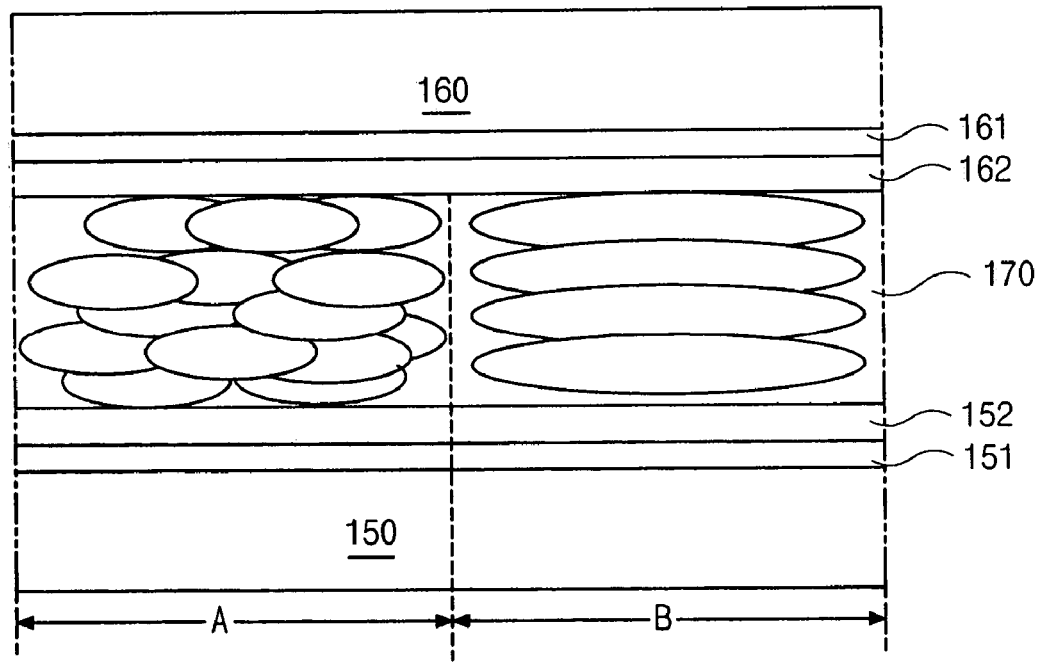
FIGS. 4A and 4B are cross-sectional views along the line IVA-IVA of FIG. 3A and the line IVB—IVB of FIG. 3B, respectively.
Figure 4B:
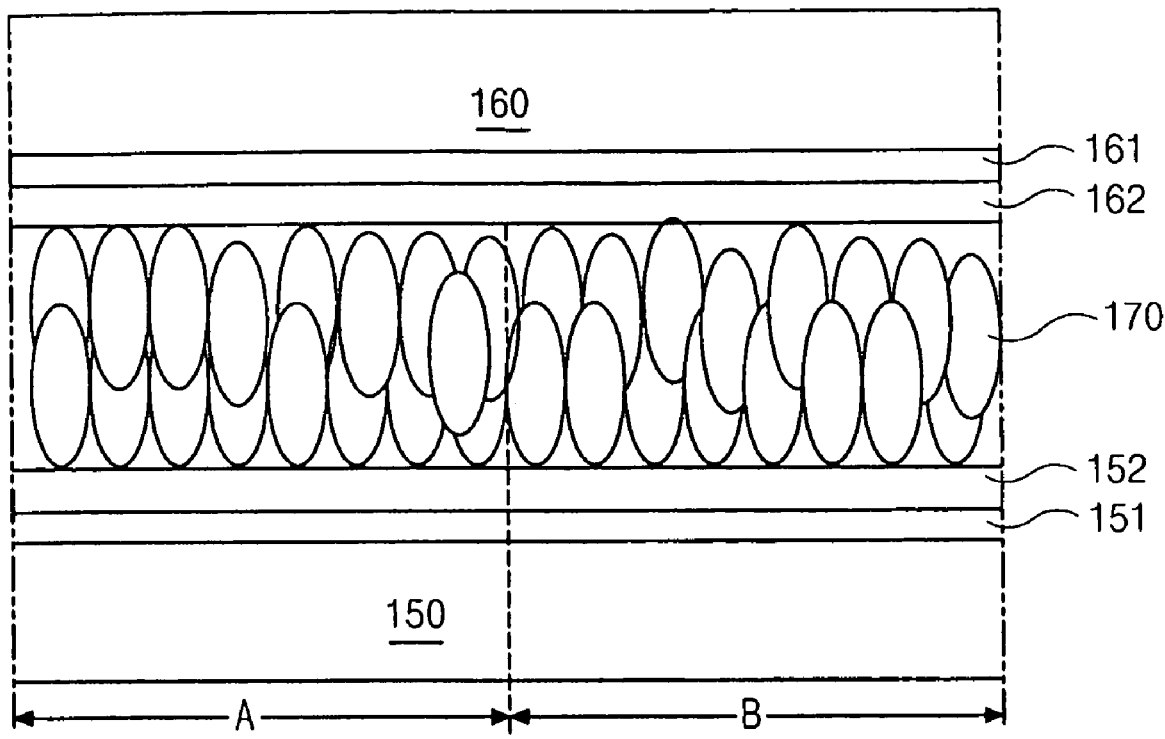

FIG. 3A is a plan view illustrating the second liquid crystal cell of the liquid crystal display (LCD) device according to the first embodiment of the present invention when an electric field is not applied, and FIG. 3B is a plan view illustrating the second liquid crystal cell of the LCD device according to the first embodiment of the present invention when an electric field is applied. FIGS. 4A and 4B are cross-sectional views along the line IVA—IVA of FIG. 3A and the line IVB—IVB of FIG. 3B, respectively.

As shown in the figures, the second liquid crystal cell LC2 includes the third and fourth substrates 150 and 160 spaced apart from and facing each other. First and second electrodes 151 and 161 are formed on inner surfaces of the third and fourth substrates 150 and 160, respectively, and first and second alignment layers 152 and 162 are formed on the first and second electrodes 151 and 161, respectively. The second liquid crystal layer 170 is interposed between the first and second alignment layers 152 and 162.

The first and second electrodes 151 and 161 are connected to the outer voltage source Vg1 of FIG. 2 through the switch S1 to induce an electric field in the second liquid crystal layer 170.

The first and second alignment layers 150 and 160 are arranged to have characteristics of holographic patterns. That is, the second liquid crystal cell LC2 has a first region A and a second region B, which are differently oriented. Each region of the alignment layers 150 and 160 may have one of vertical, horizontal and hybrid modes.

As shown in FIGS. 3A and 4A, when an electric field is not applied, liquid crystal molecules of the second liquid crystal layer 170 are arranged along an alignment direction of alignment layers 152 and 162. Therefore, the liquid crystal molecules of the second liquid crystal layer 170 in the first region A and the second region B are arranged in a different direction from each other. Thus, light passing through the second liquid crystal cell LC2 is shown in holographic patterns. At this time, a modulation depth d', which is a thickness of the second liquid crystal layer 170 that the light experiences based on the holographic patterns, differs from the real thickness of the second liquid crystal layer 170, whereby retardation d'Δn of the light also differs from real retardation dΔn and the light is diffused. Accordingly, wide viewing angles can be achieved.

As shown in FIGS. 3B and 4B, when the electric field is applied, the liquid crystal molecules are arranged horizontally or vertically with respect to the electric field according to properties of the liquid crystal molecules. Thus, the liquid crystal molecules in the first and second regions A and B are arranged in the same direction. The second liquid crystal cell LC2 does not diffuse the light and maintains narrow viewing angles provided from the first liquid crystal cell LC1 of FIG. 2.

Figure 5:
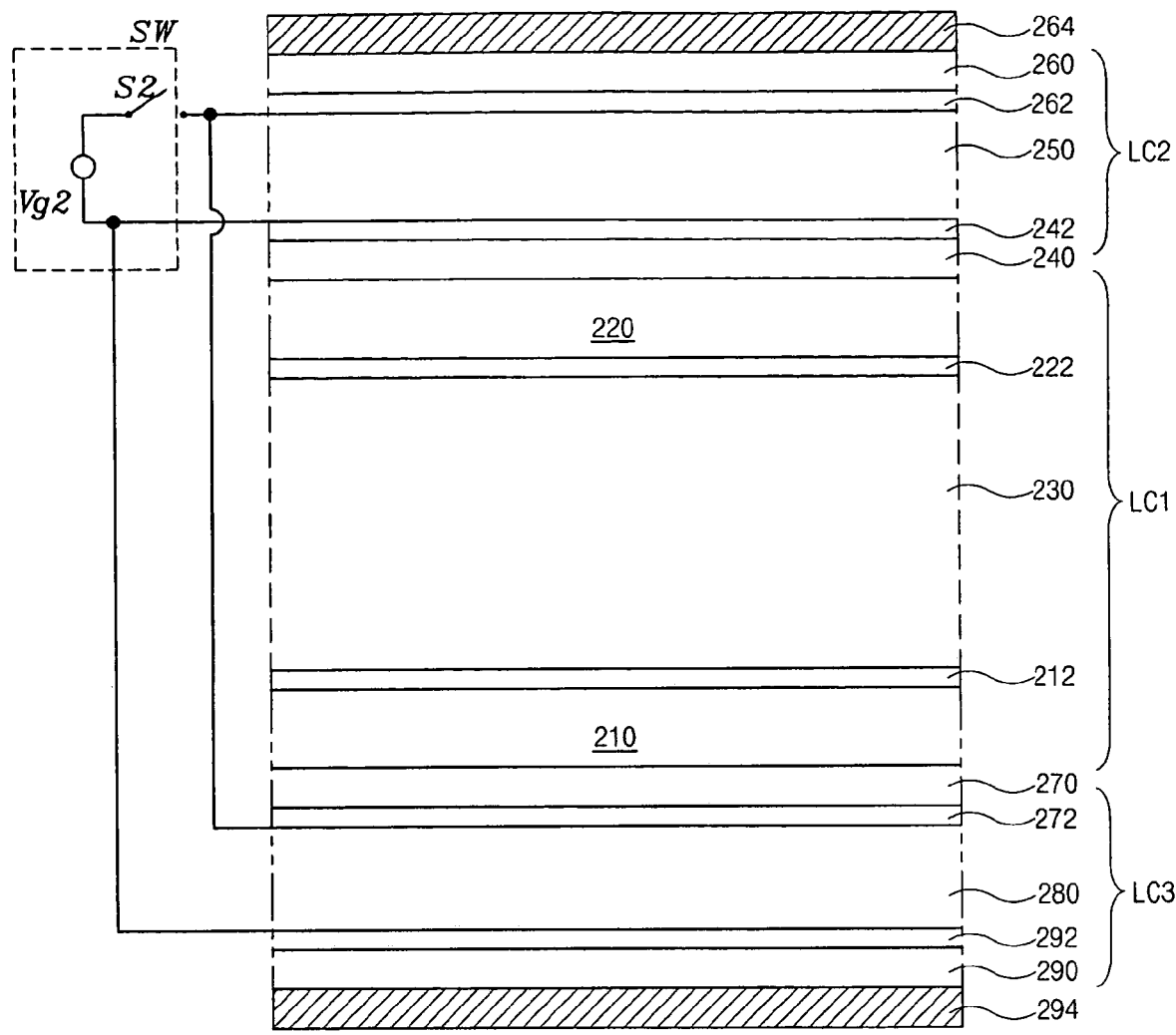
FIG. 5 is a schematic cross-sectional view of an LCD device according to a second embodiment of the present invention.

FIG. 5 is a schematic cross-sectional view of a liquid crystal display (LCD) device according to a second embodiment of the present invention.

As illustrated in FIG. 5, a first substrate 210 and a second substrate 220 are spaced apart from and facing each other. A pixel electrode 212 and a common electrode 222 are formed on inner surfaces of the first and second substrates 210 and 220, respectively. A first liquid crystal layer 230 is interposed between the pixel electrode 212 and the common electrode 222. The first substrate 210, the second substrate 220 and the first liquid crystal layer 230 constitute a first liquid crystal cell LC1. The first liquid crystal layer 230 has a twisted nematic (TN) mode.

Although not shown in the figure, a thin film transistor (TFT) may be formed on the inner surface of the first substrate 210 and may be connected to the pixel electrode 212. A color filter layer may be formed between the second substrate 220 and the common electrode 222.

A second liquid crystal cell LC2 is formed on an outer surface of the second substrate 220. The second liquid crystal cell LC2 includes third and fourth substrates 240 and 260 that are spaced apart from and facing each other and a second liquid crystal layer 250 that is interposed therebetween. A first electrode 242 is formed on an inner surface of the third substrate 240, that is, between the third substrate 240 and the second liquid crystal layer 250. A second electrode 262 is formed on an inner surface of the fourth substrate 260, that is, between the fourth substrate 260 and the second liquid crystal layer 250. The first and second electrodes 242 and 262 are connected to an outer switching part SW, which includes a voltage source Vg2 and a switch S2. The voltage source Vg2 and the switch S2 are only one example for selectively applying an electric field to the second liquid crystal layer 250, and other methods may be used.

The second liquid crystal layer 250 includes discotic liquid crystal molecules of disk shapes. The discotic liquid crystal molecules have characteristics of wide viewing angles by diffusing light when an electric field is not applied. When an electric field is applied, the discotic liquid crystal molecules have characteristics of narrow viewing angles by being arranged horizontally or vertically with respect to the electric field.

A third liquid crystal cell LC3 is formed on an outer surface of the first substrate 210. The third liquid crystal cell LC3 includes fifth and sixth substrates 270 and 290 that are spaced apart from and facing each other and a third liquid crystal layer 280 interposed therebetween. A third electrode 272 is formed on an inner surface of the fifth substrate 270, that is, between the fifth substrate 270 and the third liquid crystal layer 280. A fourth electrode 292 is formed on an inner surface of the sixth substrate 290, that is, between the sixth substrate 290 and the third liquid crystal layer 280. The third liquid crystal layer 280 also includes discotic liquid crystal molecules.

Meanwhile, the third and fourth electrodes 272 and 292 may be also connected to the switching part SW. In this case, voltage may be applied or may be not applied to the second and third liquid crystal layers 250 and 280 at the same time.

A first polarizer 294 and a second polarizer 264 are situated on outer surfaces of the third liquid crystal cell LC3 and the second liquid crystal cell LC2, respectively, and although not shown in the figure, a backlight is located on an outer surface of the first polarizer 294 to provide light.

The third, fourth, fifth and sixth substrates 240, 260, 270 and 290 may be made of one of glass, plastics and resin and beneficially, may be made in a form of an adhesive film by forming an electrode and an alignment layer on one side of a flexible film and coating an adhesive material on the other side of the flexible film.

The second and third liquid crystal layers 250 and 280 may have one of horizontal, vertical, hybrid, incline, and twist modes depending on optical characteristics of the first liquid crystal layer 230 and may be arranged differently at each pixel if viewing angles and brightness should be controlled.

In FIG. 5, the third liquid crystal cell LC3 may be used to be connected to the switching part SW, but can be used separately not to be connected to the switching part SW. If the third liquid crystal cell LC3 is not connected to the switching part SW, the third liquid crystal cell LC3 acts as an element for increasing efficiency in condensing light or a compensating plate. If the third liquid crystal cell LC3 is connected to the switching part SW, the third liquid crystal cell LC3 changes viewing angles the same as the second liquid crystal cell LC2.

The pixel electrode of each pixel and the common electrode in the first liquid crystal cell LC1 are driven according to gate and data signals, whereby the first liquid crystal cell LC1 provides light passing through the third liquid crystal cell LC3 to the second liquid crystal cell LC2 such that the light passing through the third liquid crystal cell LC3 should be changed to have narrow viewing angles.

The second liquid crystal cell LC2 supplied the light of the narrow viewing angles from the first liquid crystal cell LC1 may be used in two modes.

In case of requiring wide viewing angles, that is, when a plurality of users watches a liquid crystal display (LCD) device from various angles, for example, the LCD device is driven turning off the switch S2. If the switch S2 is turned off, a voltage from the voltage source Vg2 is not supplied to the second liquid crystal cell LC2. Therefore, the second liquid crystal layer 250 including discotic liquid crystal molecules diffuses light.

Meanwhile, in case of requiring narrow viewing angles, that is, when few users see the LCD device from limited angles, for example, the LCD device is driven turning on the switch S2. If the switch S2 is turned on, the voltage from the voltage source Vg2 is supplied to the second liquid crystal cell LC2. Accordingly, the liquid crystal molecules of the second liquid crystal layer 250 are arranged perpendicularly or parallel with respect to an induced electric field, thereby transmitting light only in certain directions.

Therefore, the viewing angles of the LCD device can be varied as occasion demands.

Movements in the second and third liquid crystal layers will be explained in detail with reference to attached drawings.

Figure 6A:
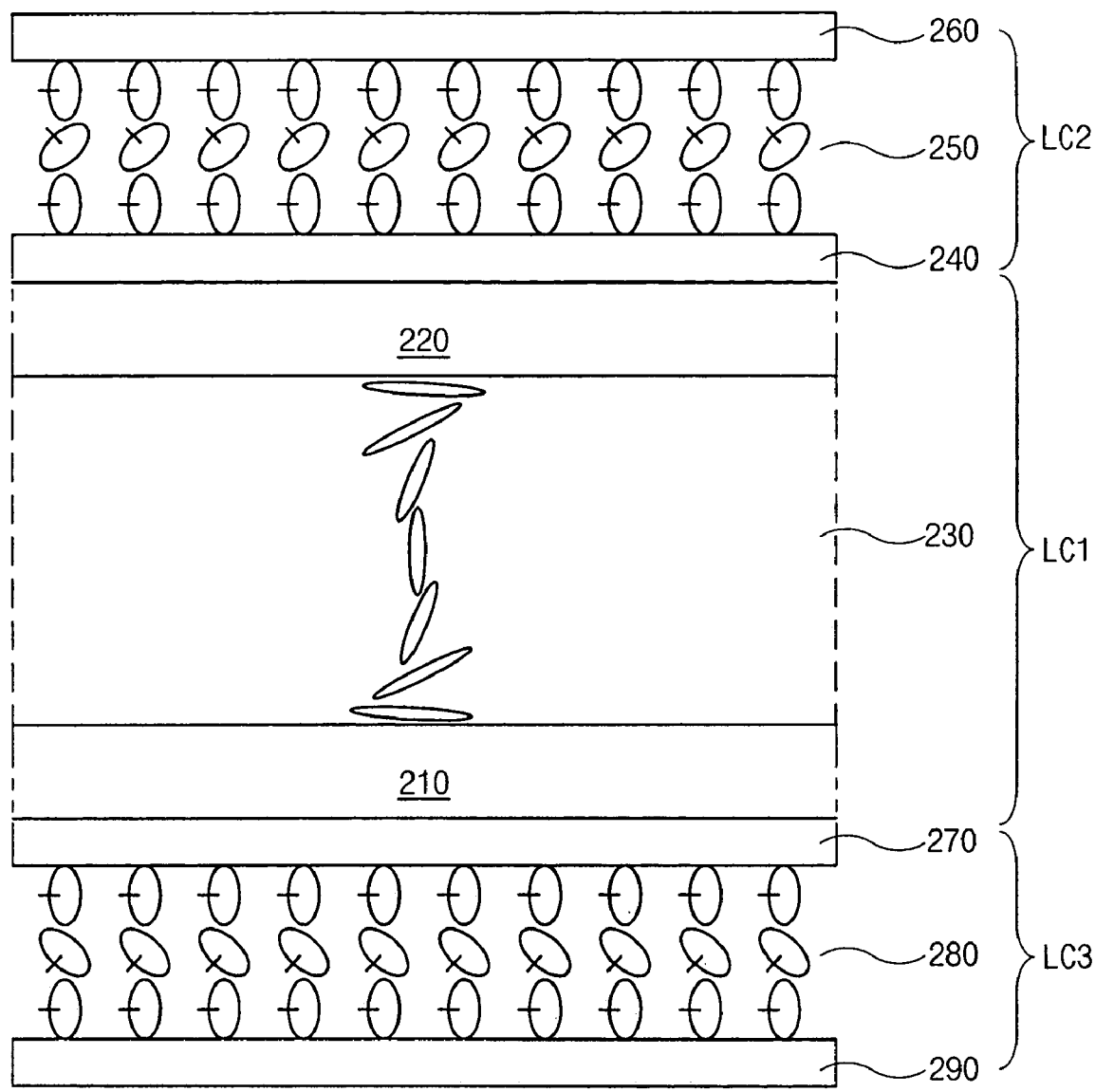
FIG. 6A is a cross-sectional view schematically illustrating the LCD device of the second embodiment when an electric field is not applied.
Figure 6B:
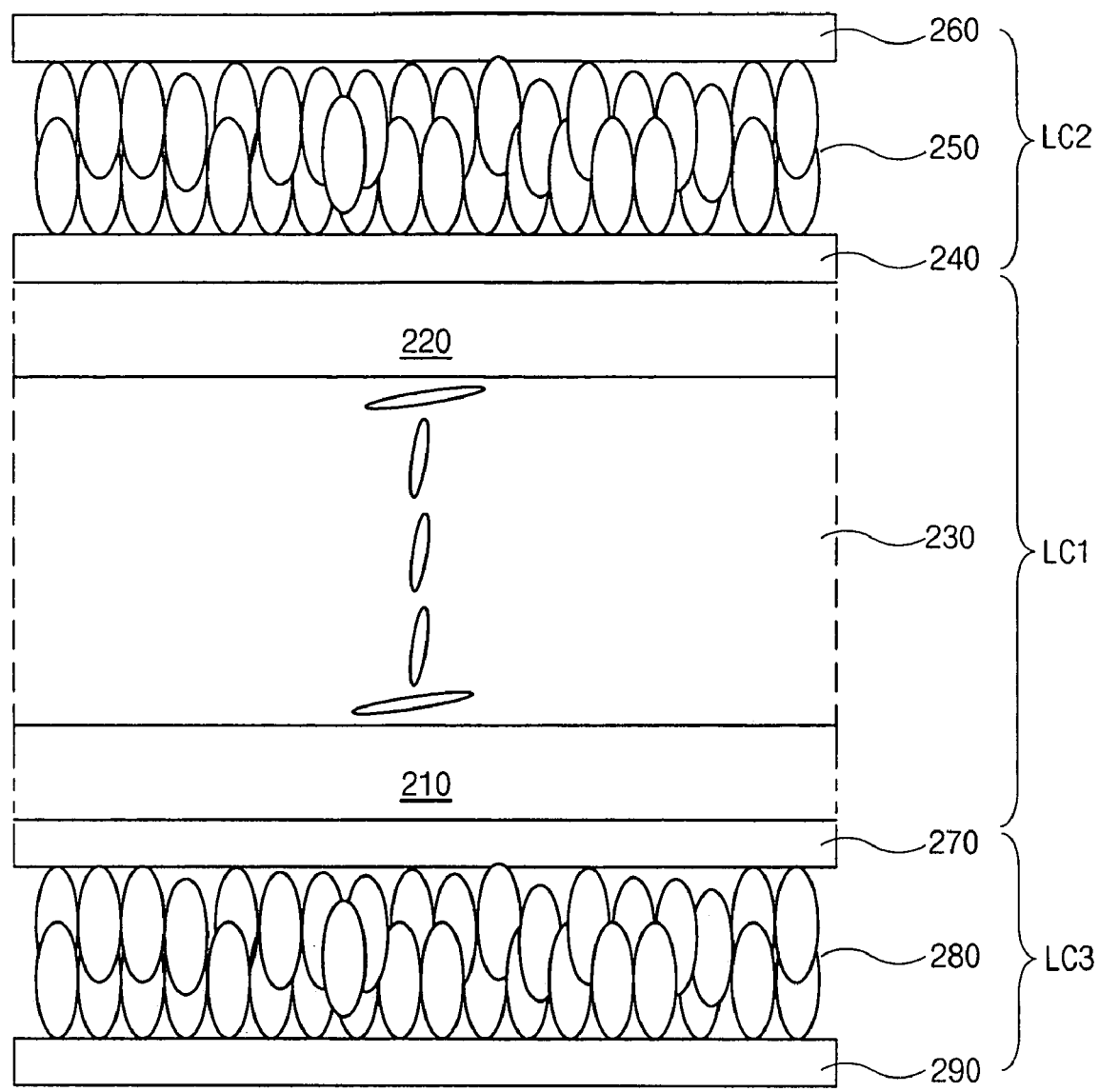
FIG. 6B is a cross-sectional view schematically illustrating the LCD device of the second embodiment when an electric field is applied.

FIG. 6A is a cross-sectional view schematically illustrating the liquid crystal display device according to the second embodiment of the present invention when an electric field is not applied, and FIG. 6B is a cross-sectional view schematically illustrating the liquid crystal display device according to the second embodiment of the present invention when an electric field is applied.

As shown in FIG. 6A, in the first liquid crystal cell LC1 including the first substrate 210, the second substrate 220 and the first liquid crystal layer 230, the first liquid crystal layer 230 is driven by gate and data signals. At this time, an electric field is not induced in the second liquid crystal cell LC2, which includes the third substrate 240, the fourth substrate 260 and the second liquid crystal layer 250, and in the third liquid crystal cell LC3, which includes the fifth substrate 270, sixth substrate 290 and the third liquid crystal layer 280, whereby the second and third liquid crystal layers 250 and 280, which are made of discotic liquid crystal molecules, diffuse light.

As shown in FIG. 6B, when electric field is induced in the second and third liquid crystal cell LC2 and LC3, the discotic liquid crystal molecules are arranged vertically or horizontally with respect to the induced electric field. In this case, the second and third liquid crystal layers 250 and 280 transmit light in a certain direction the same as normal liquid crystal, and thus the liquid crystal display device has narrow viewing angles.

As stated above, in the second embodiment of the present invention, the first liquid crystal layer 230 may use TN liquid crystal and the second and third liquid crystal layers 250 and 280 may include discotic liquid crystal molecules. In addition, the second and third liquid crystal layers 250 and 280 may have one of vertical, horizontal and hybrid modes.

Meanwhile, the third liquid crystal cell LC3 may be connected to the switching part SW of FIG. 5, but the third liquid crystal cell LC3 may function simply as a compensating plate without connection with the switching part SW. Although the third liquid crystal cell LC3 is connected to the switching part SW, the third liquid crystal cell LC3 can be driven independently on the second liquid crystal cell LC2.

On the other hand, liquid crystal of vertical alignment mode may be used as material for the first liquid crystal layer.

Figure 7:
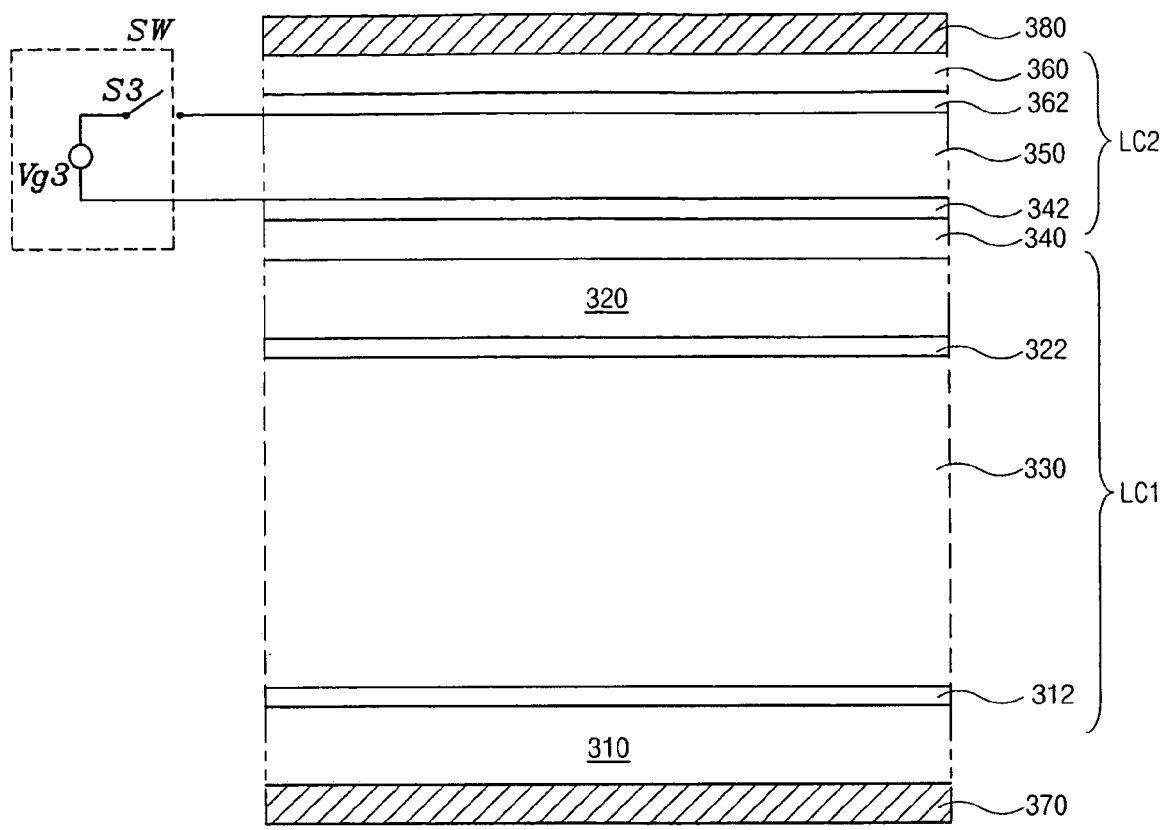
FIG. 7 is a schematic cross-sectional view illustrating an LCD device according to a third embodiment of the present invention.

FIG. 7 is a schematic cross-sectional view of illustrating a liquid crystal display device according to a third embodiment of the present invention. As shown in FIG. 7, the liquid crystal display device of the third embodiment includes a first liquid crystal cell LC1 and a second liquid crystal cell LC2 on the first liquid crystal cell LC1. The first liquid crystal cell LC1 has a first substrate 310, a second substrate 320, and a first liquid crystal layer 330 therebetween. A pixel electrode 312 and a common electrode 322 are formed on inner surfaces of the first and second substrates 310 and 320, respectively. The first liquid crystal layer 330 has a vertical alignment mode, where liquid crystal molecules are initially arranged vertically with respect to the substrates.

A first polarizer 370 is disposed on an outer surface of the first substrate 310. Although not shown in the figure, a backlight is located on the first polarizer 370, that is, on an outer surface of the first polarizer 370, as a light source.

The second liquid crystal cell LC2 is formed on an outer surface of the second substrate 320. The second liquid crystal cell LC2 includes third and fourth substrates 340 and 360 that are spaced apart from and facing each other and a second liquid crystal layer 350 that is interposed between the third and fourth substrates 340 and 360. A first electrode 342 and a second electrode 362 are formed on inner surfaces of the third and fourth substrates 340 and 360, respectively. The second liquid crystal layer 350 may include discotic liquid crystal molecules.

The first and second electrodes 342 and 362 are connected to an outer switching part SW, which includes a switch S3 and a voltage source Vg3. The voltage source Vg3 and the switch S3 are only one example for selectively applying an electric field to the second liquid crystal layer 350, and other methods may be used.

A second polarizer 380 is situated on an outer surface of the fourth substrate 360.

The third and fourth substrates 340 and 360 may be made of one of glass, plastics and resin and beneficially, may be made in a form of an adhesive film by forming an electrode and an alignment layer on one side of a flexible film and coating an adhesive material on the other side of the flexible film.

The second liquid crystal layer 350 may have one of horizontal, vertical, hybrid, incline, and twist modes depending on optical characteristics of the first liquid crystal layer 330 and may be arranged differently at each pixel if viewing angles and brightness should be controlled.

In FIG. 7, the pixel electrode of each pixel and the common electrode in the first liquid crystal cell LC1 are driven according to gate and data signals, whereby the first liquid crystal cell LC1 provides light of narrow viewing angles to the second liquid crystal cell LC2. The second liquid crystal cell LC2 supplied the light of the narrow viewing angles from the first liquid crystal cell LC1 may be used in two modes.

In case of requiring wide viewing angles, that is, when a plurality of users watches a liquid crystal display (LCD) device from various angles, for example, the LCD device is driven turning off the switch S3. If the switch S3 is turned off, a voltage from the voltage source Vg3 is not supplied to the second liquid crystal cell LC2. Therefore, the second liquid crystal layer 350 including discotic liquid crystal molecules diffuses light.

Meanwhile, in case of requiring narrow viewing angles, that is, when a few users sees the LCD device from limited angles, for example, the LCD device is driven turning on the switch S3. If the switch S3 is turned on, the voltage from the voltage source Vg3 is supplied to the second liquid crystal cell LC2. Accordingly, the liquid crystal molecules of the second liquid crystal layer 350 are arranged perpendicularly or parallel with respect to an induced electric field, thereby transmitting light only in certain directions.

Therefore, the viewing angles of the LCD device can be varied as occasion demands.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A liquid crystal display device having variable viewing angles, comprising:
   a first liquid crystal cell having first and second substrates spaced apart from and facing each other, a pixel electrode on an inner surface of the first substrate, a common electrode on an inner surface of the second substrate, and a first liquid crystal layer interposed between the pixel electrode and the common electrode;
   a second liquid crystal cell on the first liquid crystal cell, the second liquid crystal cell having third and fourth substrates spaced apart from and facing each other, a first alignment layer on an inner surface of the third substrate, a second alignment layer on an inner surface of the fourth substrate, and a second liquid crystal layer interposed between the first and second alignment layers, wherein the first and second alignment layers are arranged to have holographic patterns; and
   a switching part for selectively applying electric field to the second liquid crystal layer.

2. The device according to claim 1, wherein the second liquid crystal cell further includes a first electrode between the third substrate and the first alignment layer and a second electrode between the fourth substrate and the second alignment layer.

3. The device according to claim 2, wherein the switching part is connected to the first and second electrodes.

4. The device according to claim 1, wherein the switching part includes a voltage source and a switch.

5. The device according to claim 1, wherein the third and fourth substrates include one of glass, plastics and resin.

6. The device according to claim 5, wherein the third and fourth substrates are made of a flexible adhesive film.

7. The device according to claim 1, wherein the second liquid crystal layer has one of vertical, horizontal and hybrid modes.

8. The device according to claim 1, further comprising a first polarizer on an outer surface of the first substrate and a second polarizer on an outer surface of the fourth substrate.

9. The device according to claim 1, further comprising a backlight under the first liquid crystal cell.

10. A liquid crystal display device having variable viewing angles, comprising:
   a first substrate;
   a pixel electrode on a first surface of the first substrate;
   a first liquid crystal layer on the pixel electrode;
   a common electrode on the first liquid crystal layer;
   a second substrate on the common electrode;
   a third substrate on the second substrate;
   a first alignment layer on the third substrate and arranged to have holographic patterns;
   a second liquid crystal layer on the first alignment layer;
   a second alignment layer on a the second liquid crystal layer and arranged to have holographic patterns;
   a fourth substrate on the second alignment layer;
   a switching part that selectively applies an electric field to the second liquid crystal layer.

* * * * *